United States Patent [19]

Tanabe

[11] Patent Number: 5,747,611

[45] Date of Patent: May 5, 1998

[54] SPHERICAL POLYMER PARTICLES AND PROCESS FOR THEIR PRODUCTION

[75] Inventor: Satoshi Tanabe, Nagoya, Japan

[73] Assignee: Kogyo Kabushiki Kaisha, Nagoya, Japan

[21] Appl. No.: 796,372

[22] Filed: Feb. 6, 1997

[30] Foreign Application Priority Data

Feb. 16, 1996 [JP] Japan ................................ 8-029118

[51] Int. Cl.⁶ .............................. C08F 2/16; C08F 2/00
[52] U.S. Cl. .............................. 526/73; 526/329.2
[58] Field of Search .............................. 526/73, 329.2

[56] References Cited

FOREIGN PATENT DOCUMENTS

| 0590468 | 4/1994 | European Pat. Off. . |
| 0606930 | 7/1994 | European Pat. Off. . |
| A-63-297402 | 12/1988 | Japan . |
| A-2-60902 | 3/1990 | Japan . |
| A-7-181725 | 7/1995 | Japan . |

*Primary Examiner*—Irina S. Zemel
*Attorney, Agent, or Firm*—Oliff & Berridge, PLC

[57] ABSTRACT

Spherical polymer particles have at least two peaks, or have at least one peak and a shoulder formed on the high-molecular weight side with respect to the peak, in their chromatogram obtained by gel permeation chromatography. The spherical polymer particles can turn into a viscoelastic form in a broad temperature range, and promise a superior heat fixing performance of toner images especially when used as image forming toner.

16 Claims, 3 Drawing Sheets

SPHERICAL POLYMER PARTICLES AND PROCESS FOR THEIR PRODUCTION

BACKGROUND OF THE INVENTION

1. Field of the Invention

This invention relates to spherical polymer particles, and more particularly to spherical polymer particles usable in image forming toners.

2. Description of the Related Art

As conventional processes for producing spherical polymer particles, suspension polymerization, emulsion polymerization and dispersion polymerization are known in the art. Spherical polymer particles produced by such processes are drawing attention for their use in materials for powder coating compositions, fillers for coating compositions, treating fillers for absorption treatment and ion-exchange treatment, fillers for imparting opalescent gloss to plastic molded products, spacers for liquid-crystal device, and image forming toners.

However, spherical polymer particles produced by conventional production processes all have a very narrow molecular weight distribution. Hence, when, e.g., toner images formed on an image-receiving medium are heated to make them viscoelastic and then pressed with a roller to fix them onto the image-receiving medium, the use of such spherical polymer particles as the image forming toners requires a very strict temperature control because the toner images may turn viscoelastic in a narrow temperature range, and also tends to cause a so-called offset phenomenon in which the toner transfers to the surface of the roller and the toner on the roller contaminates image-receiving mediums passing through the fixing step. In other words, problems of a cold offset phenomenon and a hot offset phenomenon tend to occur, the former being caused by an excessively low fixing temperature and the latter being caused by an insufficient fixing strength or an excessively high fixing temperature.

The process for producing polymer particles as disclosed in Japanese Patent Application Laid-open No. 63-297402 employs a method in which diluted monomers are added after the step of, or in the course of, polymerizing seed particles, and such a method is presumed to have made molecular weight distribution somewhat broader. However, no changes are made on polymerization conditions such as temperature conditions, and the molecular weight distribution is broadened to only a smaller extent. It is also difficult to change molecular weight distribution as desired.

SUMMARY OF THE INVENTION

The present invention was made in order to solve the above problem. Accordingly, an object of the present invention is to provide spherical polymer particles that can turn into a viscoelastic form in a broader temperature range, and promise a superior heat fixing performance of toner images especially when used as image forming toners.

To achieve this object, as a first mode, the present invention provides spherical polymer particles having at least two peaks in their chromatogram obtained by gel permeation chromatography.

As a second mode, the present invention provides a process for producing spherical polymer particles, comprising the steps of;

allowing a polymerization reaction of monomers to proceed at a first temperature; and in the course of the polymerization reaction, allowing the polymerization reaction to proceed at a second temperature lower than the first temperature, in order to lower the velocity of the polymerization reaction.

These and other objects, features and advantages of the present invention are described in or will become apparent from the following description of the preferred embodiments.

DESCRIPTION OF THE PREFERRED EMBODIMENTS

The present invention will be described below in detail with reference to the accompanying drawings.

Figure 1:
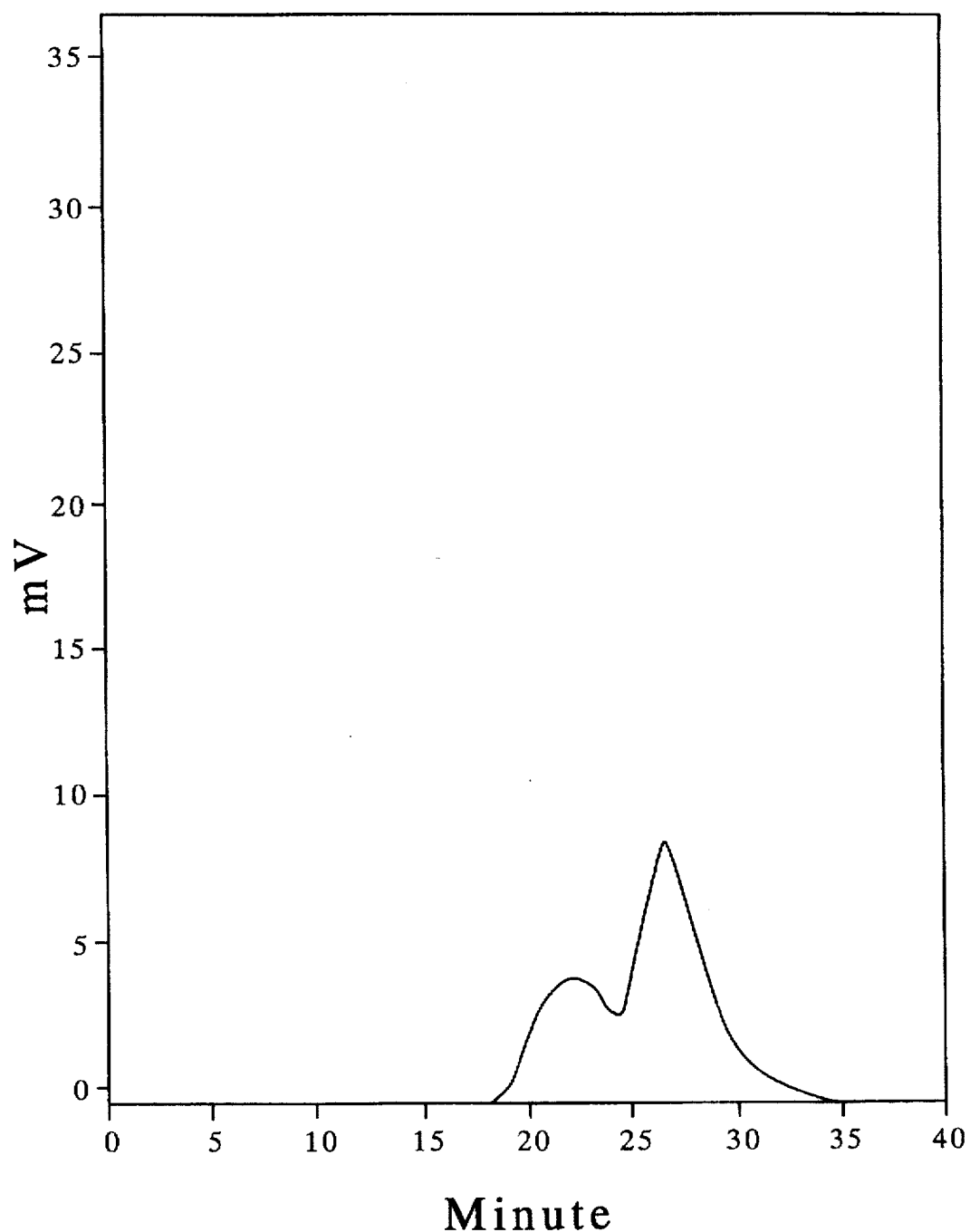
FIG. 1 is a chromatogram showing two peaks, obtained by gel permeation chromatography of spherical polymer particles according to an embodiment of the present invention.

The spherical polymer particles according to the first mode of the present invention have at least two peaks, or have at least one peak and a shoulder formed on the high-molecular weight side of the peak, in their chromatogram obtained by gel permeation chromatography. FIG. 1 is an example of a chromatogram showing two peaks, and FIG. 2 an example of a chromatogram showing one peak and a shoulder formed on the high-molecular weight side with respect to that peak.

Figure 2:
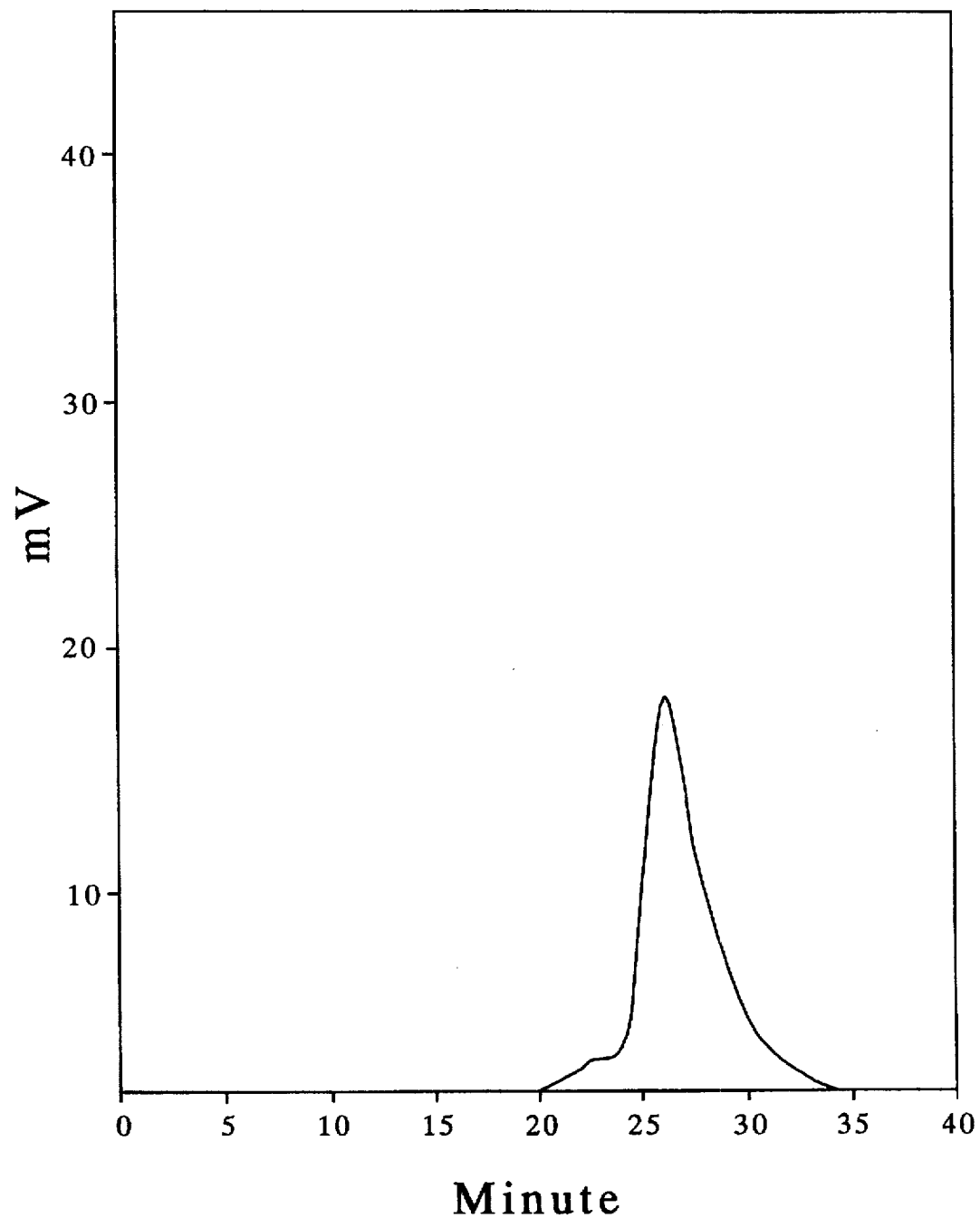
FIG. 2 is a chromatogram showing one peak and a shoulder formed on the high-molecular weight side with respect to the peak, obtained by gel permeation chromatography of spherical polymer particles according to an embodiment of the present invention.

In the chromatograms of FIGS. 1 and 2, the abscissa indicates time (unit: minute), i.e., the lapse of time after the injection of a sample into a column. As for the ordinate, it indicates signal strength outputted from an ultraviolet absorption detector, i.e., the results of measurement of the weight of molecules flowing out of the column with lapse of the time. In gel permeation chromatography, components having a greater molecular weight more quickly flow out of the column. Hence, as viewed in the chromatogram, the left is the high-molecular weight side, and the right, the low-molecular weight side.

Thus, in the chromatogram of FIG. 1, the spherical polymer particles have peaks respectively on the high-molecular weight side and the low-molecular weight side, while, in the chromatogram of FIG. 2, the spherical polymer particles have a peak on the low-molecular weight side and also a shoulder on the high-molecular weight side with respect to the peak, showing that these spherical polymer particles have a broad molecular weight distribution. Hence, the spherical polymer particles according to the present embodiments have thermal properties that they have a broad difference between the softening point and the flow point, having a broad temperature range within which the particles turn into a viscoelastic form that enables heat-pressure fixing. Thus, the spherical polymer particles do not tend to make fixing strength insufficient or cause offset, and have a superior fixing performance when used as image forming toners.

FIG. 1 shows an example where the spherical polymer particles have two peaks in their chromatogram. As other examples, the polymer particles may have three or more peaks, or may have two or more peaks and a shoulder on the high-molecular weight side with respect to at least one of the peaks.

Monomers used as a raw material for the spherical polymer particles according to these embodiments may include aromatic vinyl monomers such as styrene, vinyl toluene, and α-methylstyrene; methacrylates such as methyl methacrylate, ethyl methacrylate, 2-ethylhexyl methacrylate; acrylates such as methyl acrylate, ethyl acrylate, butyl acrylate, and ethylhexyl acrylate; vinyl esters such as vinyl formate, vinyl acetate, and vinyl propionate; vinyl ethers such as methyl vinyl ether and ethyl vinyl ether; methacrylic acid, acrylic acid, maleic anhydride, and metal salts of these; monomers having a functional group, such as diethylaminoethyl methacrylate and diethylaminoethyl acrylate; and monomers containing fluorine, such as trifluoroethyl methacrylate and tetrafluoropropyl methacrylate.

When used as image forming toners, the spherical polymer particles may preferably have a high transparency in order to be applicable in OHP, and may preferably have high insulating properties in order to obtain good developed images. The spherical polymer particles must also have a high mechanical strength at normal temperature and may preferably be capable of being softened without use of so much energy and fixed to image-receiving mediums. In view of the foregoing, when the spherical polymer particles according to the present embodiments are used as image forming toners, they may preferably be formed of a copolymer using styrene and at least one of acrylates and methacrylates as monomers.

There are no particular limitations on the particle diameter of the spherical polymer particles. When used as image forming toners, the spherical polymer particles may preferably have particle diameters of from 3 to 10 μm.

As a cross-linking agent, divinylbenzene, ethylene glycol diacrylate or dimethacrylate, butanediol diacrylate or dimethacrylate, trimethyrolpropane triacrylate or trimethacrylate, or pentaerythritol triacrylate or trimethacrylate may be added. Also when the polymer constituting the spherical polymer particles has a crosslinked structure and contains any insoluble matter that does not dissolve in solvents for gel permeation chromatography, such as chloroform or tetrahydrofuran, the same effect can be obtained so long as the chromatogram obtained by gel permeation chromatography of the components from which the insoluble matter has been removed by filtration is as shown in FIG. 1 or 2.

The second mode of the present invention, the process for producing spherical polymer particles, will be described below.

This production process is a polymerization process such as conventionally known solution polymerization, dispersion polymerization, suspension polymerization or emulsion polymerization to which a special temperature operation is added. More specifically, monomers are subjected to polymerization reaction that proceeds at a first temperature, and, in the course of the polymerization reaction (i.e., while a part of the monomers remain in the polymerization system), the polymerization reaction is allowed to proceed at a second temperature lower than the first temperature, e.g., to undergo rapid cooling. There are no particular limitations on the manner for the rapid cooling, and, e.g., a method may be employed in which the polymerization reaction vessel is immersed in ice water.

Addition of such a special temperature operation enables production of the spherical polymer particles having at least two peaks or the spherical polymer particles having at least one peak and a shoulder formed on the high-molecular weight side with respect to the peak in their chromatogram obtained by gel permeation chromatography, i.e., spherical polymer particles having a broad molecular weight distribution and capable of turning into a viscoelastic form that enables fixing in a broad temperature range. The reason therefor is unclear, and is presumed as follows: Some active points in the polymerization system cause termination reaction as a result of the rapid cooling, and meanwhile the remaining active points further continually undergo polymerization reaction to bring about a further increase in molecular weight.

When the spherical polymer particles for toners are produced, it is necessary to achieve a particle size distribution with uniform particle diameters of 3 to 10 μm, having less scattering in particle diameter. Hence, when the production process of the present invention is worked, it is preferable to use dispersion polymerization in which polymerization is carried out in a solvent that can dissolve monomers but can not substantially dissolve the polymer obtained from the monomers, as disclosed in Japanese Patent Application Laid-open No. 2-60902. Such a solvent may include lower alcohols such as methanol, ethanol, isopropanol and n-butanol, or a mixed solvent of any of these and water.

In the present invention, the timing at which the first temperature is dropped to the second temperature may be appropriately determined taking account of the reaction characteristics as described below.

That is, spherical polymer particles having a larger peak on the high-molecular weight side of the two peaks in the chromatogram obtained by gel permeation chromatography (i.e., particles having more high-molecular weight components) can be obtained when the polymerization system is cooled in a short time after the initiation of polymerization while monomers still remain in the system in a large quantity. On the other hand, spherical polymer particles having less high-molecular weight components can be obtained when the polymerization system is cooled at a late timing so as to be cooled at the time when the monomers remain in the system in a small quantity.

In the present invention, the polymerization may be allowed to proceed as it is at the second temperature dropped from the first temperature. Preferably, after the polymerization is carried out at the second temperature, the polymerization temperature may be raised to a third temperature higher than the second temperature to allow the polymerization reaction to proceed at that temperature. This makes it possible to shorten the time taken before the polymerization reaction is completed and also makes it easy to control molecular weight distribution.

In the production process of the present invention, the first temperature may preferably be in the range of from about 50° to 80° C., which are temperatures commonly used when spherical polymer particles are produced. The second temperature dropped from the first temperature may preferably be in the range from about 15° to 45° C., because substantially no polymerization reaction may proceed at an excessively low temperature. The second temperature may more preferably be about 20° C.

With regard to the third temperature raised from the second temperature, the polymerization proceeds rapidly if the third temperature is too high, and hence the high-molecular weight side component has a relatively low molecular weight and consequently the difference between the molecular weight of the high-molecular weight side component and the molecular weight of the low-molecular weight side component becomes smaller to no longer make molecular weight distribution broader. Also, the polymerization reaction proceeds mildly if this temperature is too low, and hence, although the high-molecular weight side component has a higher molecular weight, it takes too much time for the reaction. Accordingly, the third temperature may preferably be set so as to be higher than the second temperature and also lower than the first temperature. When the first temperature is about 50° to 80° C. and the second temperature dropped from the first temperature is about 15° to 45° C., the third temperature may preferably be about 20° to 60° C.

EXAMPLES

The present invention will be described below in greater detail by giving Example based on the embodiment described above, and Comparative Example thereof.

Example

An example of the process for producing the spherical polymer particles will be shown below.

The following materials were charged into a reaction vessel having a stirrer, a condenser, a thermometer and a gas feed pipe, and were stirred to make them dissolve.

|  | (by weight) |
| --- | --- |
| Methanol | 390 parts |
| 2-Propanol | 97 parts |
| Polyvinyl pyrrolidone K-30 | 20 parts |
| 1-Hexadecanol | 5 parts |
| Styrene | 125 parts |
| n-Butyl acrylate | 42 parts |
| a,a'-azobisisobutyronitrile | 10 parts |

The solution obtained was heated to 60° C. while stirring it at 100 rpm and while feeding nitrogen gas from the gas feed pipe to purge the inside. Here, styrene and n-butyl acrylate are the monomers as used in the present invention, and methanol and 2-propanol are solvents.

After the polymerization was carried out for 5 hours and in the state where styrene and n-butyl acrylate not still polymerized remained by about a half of the styrene and n-butyl acrylate originally dissolved, the reaction system was cooled to 20° C. in 5 minutes using an ice water bath and subsequently heated to 40° C. to carry out polymerization for further 48 hours. After the polymerization was completed, the reaction system was cooled to room temperature, and the polymer particles obtained were collected by filtration, followed by washing with methanol. The polymer particles thus washed was left to stand at room temperature for 48 hours to make them dry.

The polymer particles thus obtained was observed using a scanning electron microscope to confirm that they were formed in spheres. Their particle diameters were also measured using a Coulter counter to find that they had a volume average particle diameter of 4.8 μm. Meanwhile, they had a number average particle diameter of 4.7 gm, which was substantially the same as the volume average particle diameter. As is seen from this fact, the spherical polymer particles have less scattering in their particle diameter.

The molecular weight of the spherical polymer particles was measured by gel permeation chromatography using tetrahydrofuran as a solvent. As a result, a chromatogram similar to that shown in FIG. 1 was obtained. The whole weight-average molecular weight was about 200,000, and the number-average molecular weight was about 19,000. At the peak on the high-molecular weight side, the weight-average molecular weight was about 540,000 and the number-average molecular weight was about 290,000. At the peak on the low-molecular weight side, the weight-average molecular weight was about 27,000 and the number-average molecular weight was about 12,000. Their thermal properties were also measured using a flow tester (CFT-500, manufactured by Shimadzu Corporation) to reveal that the polymer particles had a softening point of 91° C. and a flow point of 129° C., where the difference between the softening point and the flow point was 38° C.

A method of forming the spherical polymer particles into toner will be shown below.

A dye KAYALON Polyester Black S200 (trade name, available from Nippon Kayaku Co., Ltd.) and a charge control agent BONTRON E-84 (trade name, available from Orient Chemical Industries Ltd.) were charged in excess in methanol, followed by stirring. Thereafter, the dye and charge control agent having not dissolved were separated by filtration. In 5 parts by weight of the saturated solution thus obtained, 1 part by weight of the spherical polymer particles obtained in the manner described above was charged with stirring to effect dispersion. While keeping temperature at 30° C., the stirring was continued for 1 hour, and dyed spherical polymer particles were collected by filtration, and then air-dried, followed by disintegration by means of a hybridization system (NSH-O, manufactured by Nara Kikai Seisakusho K.K.) to make them into primary particles. To 100 parts by weight of the dyed spherical polymer particles thus disintegrated, 3 parts by weight of hydrophobic silica (HDK H2000, available from Wacker Co.) was externally added while being mixed with stirring, to obtain a black toner. A toner cartridge of a commercially available laser printer (MICROLINE 400, trade name, manufactured by Oki Electric Industry Co., Ltd.) was filled with this toner to make a printing test. As a result, a sufficient fixing strength was achieved and also no offset was seen.

Comparative Example

A comparative example of the above Example will be shown below.

Like the above Example, compositionally the same materials as in Example were charged into a reaction vessel having a stirrer, a condenser, a thermometer and a gas feed pipe, and were stirred to make them dissolve. The solution obtained was heated to 60° C. while stirring it at 100 rpm and while feeding nitrogen gas from the gas feed pipe to purge the inside.

Polymerization was carried out for 10 hours to polymerize substantially in total weight the styrene and n-butyl acrylate dissolved. Thereafter, the reaction system was cooled to 20° C. in 5 minutes using an ice water bath and the polymer particles obtained were collected by filtration, followed by washing with methanol. The polymer particles thus washed was left to stand at room temperature for 48 hours to make them dry.

The polymer particles thus obtained was observed using a scanning electron microscope to confirm that they were formed in spheres. Their particle diameters were also measured using a Coulter counter to find that they had a volume average particle diameter of 4.7 μm.

Figure 3:
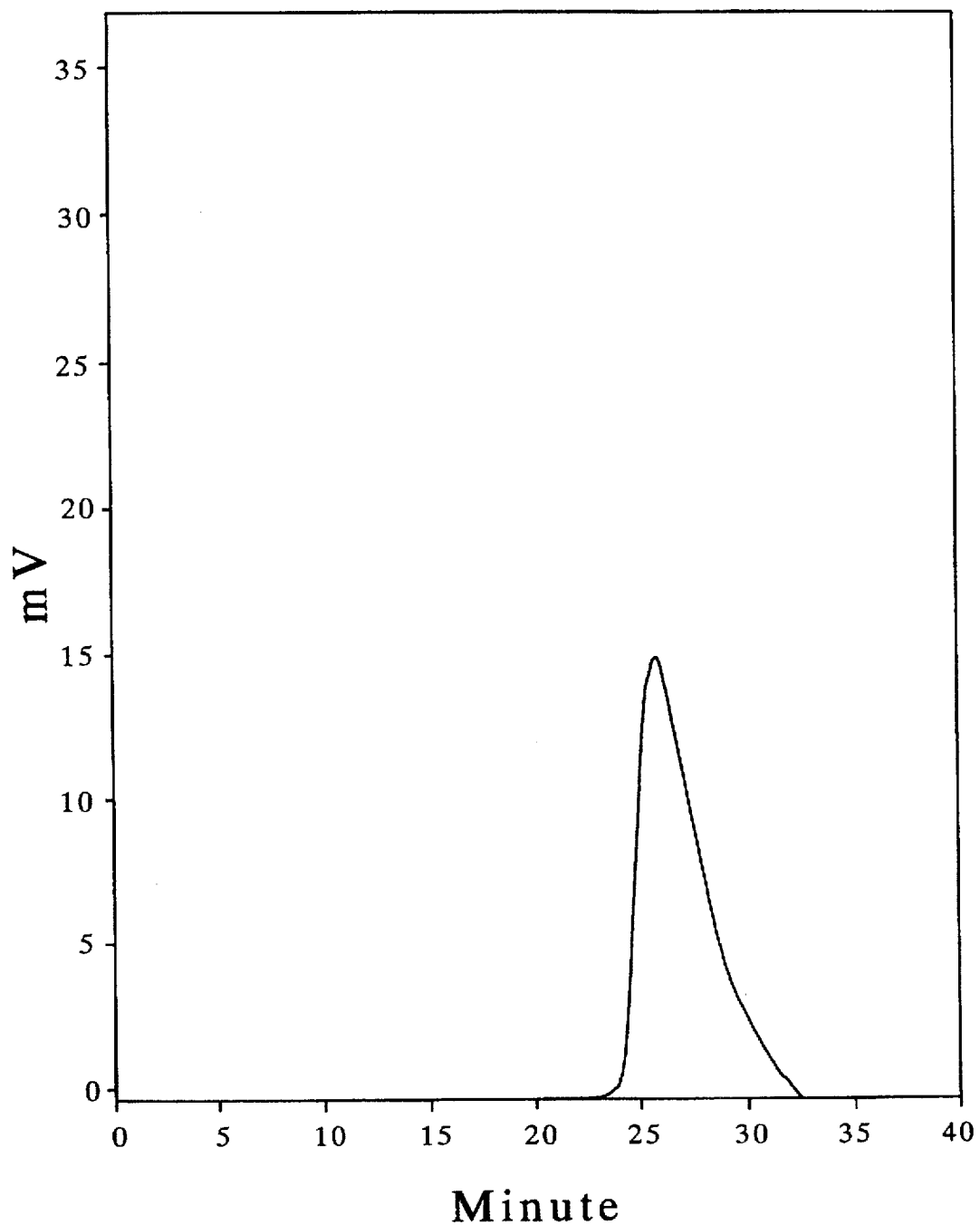
FIG. 3 is a chromatogram showing only one peak, obtained by gel permeation chromatography of conventional spherical polymer particles.

The molecular weight of the spherical polymer particles was measured by gel permeation chromatography using tetrahydrofuran as a solvent. As a result, a chromatogram as shown in FIG. 3, having one peak and having no shoulder was obtained. The whole weight-average molecular weight was about 47,000, and the number-average molecular weight was about 14,000. Their thermal properties were also measured using a flow tester (CFT-500, manufactured by Shimadzu Corporation) to reveal that the polymer particles had a softening point of 90° C. and a flow point of 121° C., where the difference between the softening point and the flow point was 31° C.

The spherical polymer particles thus obtained was formed into toner in the same manner as in Example, and a printing test was made in the same manner as in Example. As a result, offset was seen.

The entire disclosure of Japanese Patent Application No.8-29118 filed on Feb. 16, 1996 including specification, claims, drawings and summary are incorporated herein by reference in its entirely.

What is claimed is:

1. A spherical polymer particle having at least two peaks in its chromatogram obtained by gel permeation chromatography, wherein the spherical polymer particle comprises radical polymerization polymer;

the spherical polymer particle is solid at a temperature at least between 20° C. and 25° C.; and the spherical polymer particle has a particle diameter of from 3 µm to 10 µm.

2. The spherical polymer particle according to claim 1, wherein the spherical polymer particles are formed from at least one monomer selected from the group consisting of aromatic vinyl monomers, methacrylates, acrylates, vinyl esters, vinyl ethers, a methacrylic acid or a metal salt thereof, an acrylic acid or a metal salt thereof, maleic anhydride or a metal salt thereof, monomers having a functional group, and monomers containing fluorine.

3. The spherical polymer particle according to claim 1, wherein the spherical polymer particles are formed from at least one monomer selected from the group consisting of styrene, an acrylate and a methacrylate.

4. A spherical polymer particle having at least one peak and a shoulder formed on a high-molecular weight side with respect to the peak, in its chromatogram obtained by gel permeation chromatography, wherein the spherical polymer particle comprises radical polymerization polymer;

the spherical polymer particle is solid at a temperature at least between 20° C. and 25° C.; and the spherical polymer particle has a particle diameter of from 3 µm to 10 µm.

5. The spherical polymer particle according to claim 4, wherein the spherical polymer particles are formed from at least one a monomer selected from the group consisting of aromatic vinyl monomers, methacrylates, acrylates, vinyl esters, vinyl ethers, a methacrylic acid or a metal salt thereof, an acrylic acid or a metal salt thereof, maleic anhydride or a metal salt thereof, monomers having a functional group, and monomers containing fluorine.

6. The spherical polymer particle according to claim 4, wherein the spherical polymer particles are formed from at least one monomer selected from the group consisting of styrene, an acrylate and a methacrylate.

7. A process for producing a spherical polymer particle, comprising the steps of;

allowing polymerization reaction of a monomer to proceed at a first temperature; and in the course of the polymerization reaction, allowing the polymerization reaction to proceed at a second temperature lower than the first temperature, in order to lower a polymerization reaction velocity;

wherein the spherical polymer particle has at least two peaks or at least one peak and a shoulder formed on a high-molecular weight side with respect to the peak, in its chromatogram obtained by gel permeation chromatography;

the spherical polymer particle comprises radical polymerization polymer;

the spherical polymer particle is solid at a temperature at least between 20° C. and 25° C.; and the spherical polymer particle has a particle diameter of from 3 µm to 10 µm.

8. The process according to claim 7, wherein said first temperature is in the range of from about 50° C. to about 80° C., and the second temperature is about 20° C.

9. The process according to claim 7, further comprising, after allowing the polymerization reaction to proceed at the second temperature, allowing the polymerization reaction to proceed at a third temperature higher than the second temperature.

10. The process according to claim 9, wherein said first temperature is in the range of from about 50° C. to about 80° C., the second temperature is about 20° C., and the third temperature is in the range of from about 20° C. to about 60° C.

11. The spherical polymer particle of claim 1, for use in an image-forming toner.

12. The spherical polymer particle of claim 4, for use in an image-forming toner.

13. The spherical polymer particle of claim 1, produced by the steps of: allowing polymerization reaction of a monomer to proceed at a first temperature; and in the course of the polymerization reaction, allowing the polymerization reaction to proceed at a second temperature lower than the first temperature, in order to lower a polymerization reaction velocity.

14. The spherical polymer particle of claim 13, wherein said first temperature is in the range of from about 50° C. to about 80° C., and the second temperature is about 20° C.

15. The spherical polymer particle of claim 13, wherein the polymerization reaction proceeds at a third temperature higher than the second temperature after proceeding at the second temperature.

16. The spherical polymer particle of claim 15, wherein said first temperature is in the range of from about 50° C. to about 80° C., the second temperature is about 20° C., and the third temperature is in the range of from about 20° C. to about 60° C.

* * * * *

UNITED STATES PATENT AND TRADEMARK OFFICE
CERTIFICATE OF CORRECTION

PATENT NO. : 5,747,611
DATED : May 5, 1998
INVENTOR(S) : Satoshi TANABE

It is certified that error appears in the above-indentified patent and that said Letters Patent is hereby corrected as shown below:

On the cover page, after "[73] Assignee:" insert --Brother--.

Col. 5, line 34, last line in the chart, change "a,a'-azobisisobutyronitrile" to --α,α'-azobisisobutyronitrile--

Col. 8, claim 7, line 11, after "peaks" insert --,--.

Signed and Sealed this

Fourth Day of August, 1998

Attest:

BRUCE LEHMAN

Attesting Officer

Commissioner of Patents and Trademarks